March 5, 1968     G. GRASSMANN     3,371,393
HOT-SAW BLADE
Filed March 4, 1966

Günther Grassmann
INVENTOR.

BY Karl G. Ross
Attorney

United States Patent Office 3,371,393
Patented Mar. 5, 1968

3,371,393
HOT-SAW BLADE
Günther Grassmann, Eddesse 40, uber Peine, Germany
Filed Mar. 4, 1966, Ser. No. 531,863
6 Claims. (Cl. 29—95)

My present invention relates to metal-cutting saws and, more particularly, to improved sawblades for the severing of billets, structural shapes, rods and the like conventionally operating with the so-called "hot-saw technique" and thus to sawblades for cutting hot metal.

So-called "hot-saws" and similar machines have been provided heretofore with toothed sawblades both of the continuously moving (e.g. band or circular) and the reciprocating type, the sawblades generally having alternate teeth turned to one side or the other and, possibly, separated by straight teeth, so as to enlarge the clearance formed by the blade. It has also been proposed heretofore to spread these alternate teeth or spaced-apart teeth by notching them so that the corners of these teeth project laterally and thus enlarge the width of the cut beyond the thickness of the blade between its planar surfaces. Thus, a disk-type blade provided with such teeth will constantly form a cut whose width exceeds the thickness of the sheet metal of the band or the disk and the cross-section of the flat portions beyond the toothed part of the blade. The deflected portions of the teeth thus serve to create a clearance through which the flat portions of the blade can pass with ease and without binding. The remaining (i.e. straight 3 teeths serve substantially as reamers and broaching members since their edges are inwardly of the projecting corners.

In general, a sawblade of this type has the significant advantage that the frictional engagement of the blade and the workpiece is relatively small and even insignificant while the clearance-forming, outwardly turned portions of the teeth can be produced without "setting" of the sawblade teeth in the usual manner, thereby decreasing the manufacturing cost of such a blade. In spite of the success of earlier efforts along these lines with "hot-saw" blades, it was nevertheless not possible to approach the effectiveness of so-called "cold-saw" blades manufactured by setting of the teeth.

It is, therefore, an important object of this invention to provide an improved hot-saw blade of the general character described wherein, however, the sawblade is of greater effectiveness without material increase in cost and can be considered as approaching in operating efficiency the conventional cold-saw blades with set teeth.

A further object of this invention is to provide a relatively inexpensive and highly efficient hot-saw blade whose teeth are capable of forming a clearance beyond the width or thickness of the planar portions of the blade.

These objects and others which will become apparent hereinafter are attained, and accordance with the present invention, with a sawblade comprising a succession of teeth, advantageously a hot-saw blade, which teeth are notched generally along a plane parallel to the plane of the blade with V- or wedge-shaped indentations or incisions which spread the teeth laterally so as to enable them to define a clearance in excess of the width of the blade between its planar surfaces. I have discovered, and it is a critical characteristic of the present invention, that lateral staggering of the notches of the successive teeth increases markedly the effectiveness of the cutting operation of the blade. Apparently, this result is obtained because of the provision of offset edges of the successive blades which constitute reaming and broaching edges for the prior blade of the next forwardly tooth in the direction of movement of the blade. Thus, each tooth fulfills the double function of reamer or broach for the previous tooth and a clearance cutter for which the next (rearwardly) tooth constitutes the reamer or broach. Not only is the sawing effectiveness of the blade augmented, but the improved result it attained without any increase in the manufacturing cost by comparison with those earlier sawblades in which only spaced-apart teeth were indented in a common plane. In practice, it is observed that the hot-saw blade with staggered notching of the teeth in the manner described approaches cold-saw blades with set teeth in effectiveness.

According to a more specific feature of this invention, the notches are provided upon the sawblade in a repetitive pattern wherein a forwardly blade is notched so that the apex of the notch lies rearwardly in the direction of movement of the cutting edges and the notches of successive teeth in the sense of the order of engagement with the workpiece are disposed at different distances from the flank of the blade. Thus, one tooth of the repetitive pattern may be provided with a single notch in the region of the median plane through the toothed portion of the blade parallel to the flanks thereof while a subsequent tooth of the pattern will have a pair of notches or at least one notch closer to respective lateral flanks of the blade. I have found further that it is of considerable advantage when the depth of the notch is reduced progressively as the notch is disposed closer to a respective flank and more distally from this median plane. Thus, the deepest notches will be those disposed in the region of the median plane whereas notches more distal from the median plane will have reduced depth.

These and other objects, features and advantages will become more readily apparent from the following description, reference being made to the accompanying drawing in which.

Figure 1:
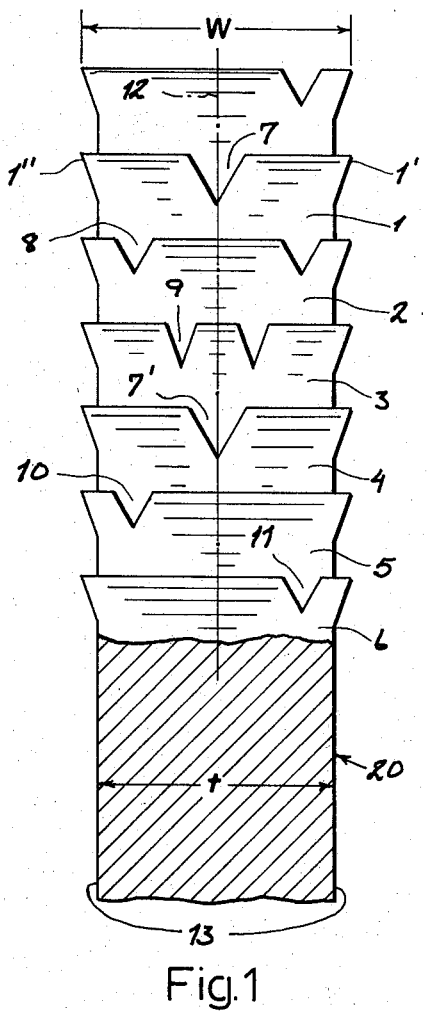
FIG. 1 is an edge view of a portion of a hot-saw blade embodying the principles of the invention.

In the drawing, I show a sawblade 20 which can represent any conventional blade type for a hot saw and is intended, therefore, to be considered either as an endless band, a disk-type or a reciprocating blade. The blade comprises an array of teeth along its cutting edge in a six-tooth repetition pattern, the teeth being respectively designated at 1–6 and being engageable in order with a workpiece in normal use. The teeth 1–6 are provided with wedge-shaped notches or indentations 7–11 driven into the respective teeth so as to spread the blades laterally whereby the edges 1' and 1" etc. serve to form a clearance in the workpiece whose thickness or width $w$ is less than the thickness $t$ of the blade between its lateral flanks 13. Thus, each tooth is spread on each side of the blade by a distance equal substantially to $$\frac{(w-t)}{2}$$

Figure 2:
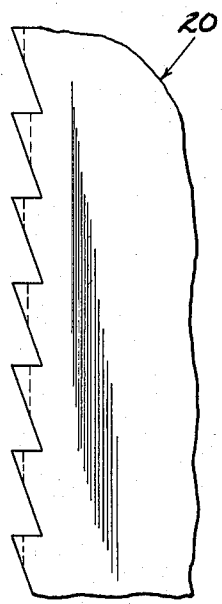
FIG. 2 is an elevational view of a fragment of this blade.

According to the principal feature of the present invention, the notches 8 and 9 of successive teeth are offset laterally from the notch 7 of a more forwardly tooth. Thus, the notch 7 can lie along the median plane 12 through the blade parallel to its flanks 13 and, like all of the notches (7–11), extends parallel to the plane of the blade. The notches 8 of the next tooth 2 are disposed symmetrically on opposite sides of the median plane 12 proximal to the lateral flanks 13 of the blade whereas the pair of notches 9 of the next tooth 3 are likewise symmetrically disposed on opposite sides of the plane 12 but are more inwardly from the lateral flanks. A further notch 7' is indented along the plane 12 corresponding to the notch 7 while a single notch 10 serves to deform the tooth 5 and is disposed proximally to the left-hand flank 13 (FIG. 1) and the tooth 6 has a notch 11 close to the right-hand flank 13 of the blade. This arrangement is repeated with the corresponding pattern over the entire cutting edge of the blade. As can be seen from FIG. 2, the depth of the notches 7–11 decreases as these notches approach the lateral flanks 13 of the blade inasmuch as indentation closer to the lateral flanks need displace less material to produce the deflected portions 1', 1" etc.

The invention described and illustrated is believed to admit of many modifications within the ability of persons skilled in the art, all such modifications being considered within the spirit and scope of the appended claims.

I claim:

1. A hot-saw blade comprising a generally flat body having an edge provided with a succession of blade teeth, at least some of said teeth being notched in the plane of said body to deform them laterally outwardly, the notches of successive ones of said some of said teeth being laterally offset successively along said edge.

2. A blade as defined in claim 1 wherein some of said notches are disposed more proximally to the lateral flanks of said body and others are disposed more proximally to a median plane through said body between said flanks and parallel thereto, the notches decreasing in depth with increasing proximity to said lateral flanks.

3. A blade as defined in claim 2 wherein at least one of said teeth has a notch lying along said plane and at least one successive tooth has a pair of notches disposed outwardly of said notch along said plane.

4. A blade as defined in claim 1 wherein some of said notches are disposed proximally to the lateral flanks of said body.

5. A blade as defined in claim 1 wherein all of said teeth are notched in a repetitive pattern wherein at least one notch lies along a median plane through said body between said flanks and parallel thereto and at least one notch of said pattern lies proximally to each of said flanks.

6. A blade as defined in claim 1 made by impressing a wedge-shaped indenting tool into said some of said teeth at laterally offset locations successively around said edge in the plane of said body and to different depths in dependence upon the proximity of the impression to the lateral flanks of the disk.

References Cited

UNITED STATES PATENTS 298,886  5/1884  Peak _____ 143—133

FOREIGN PATENTS 866,663  5/1941  France.

HARRISON L. HINSON, *Primary Examiner.*